United States Patent [19]

Fain

[11] 3,922,090

[45] Nov. 25, 1975

[54] METHOD AND APPARATUS FOR AUTHENTICATING DOCUMENTS

[75] Inventor: David L. Fain, Berkeley, Calif.

[73] Assignee: Teknekron, Inc., Berkeley, Calif.

[22] Filed: June 28, 1974

[21] Appl. No.: 483,990

[52] U.S. Cl. .................. 356/71; 356/178; 356/186; 250/566

[51] Int. Cl.[2] ......................... G06K 9/08; G01J 3/46

[58] Field of Search ............ 356/71, 173, 178, 186, 356/195; 250/566

[56] References Cited

UNITED STATES PATENTS 3,679,314 7/1972 Mustert ................................ 356/71

*Primary Examiner*—Vincent P. McGraw
*Assistant Examiner*—Jon W. Henry
*Attorney, Agent, or Firm*—Flehr, Hohbach, Test, Albritton & Herbert

[57] ABSTRACT

A document authentication apparatus for optically scanning document paper to verify the presence of colored fibers in the paper and for indicating the authenticity of the document if a predetermined number of fibers is present. The apparatus reflects white light off of the document and filters the white light into components of red and blue light. The red and blue light components are each incident on a photomultiplier tube that is connected to one channel of a signal processing circuit. The signal processing circuit produces two signals indicating the presence of the red and the blue fibers on the document and eliminates those signals representing the other colors on the document. The signal processing circuit includes a fiber width discriminator to eliminate signals not originating from fibers and an illumination level compensator for adjusting the circuit for variations in reflectivity of the documents. If a predetermined, minimum number of fibers of each color is counted on the document the apparatus indicates the document to be authentic.

11 Claims, 3 Drawing Figures

METHOD AND APPARATUS FOR AUTHENTICATING DOCUMENTS

BACKGROUND OF THE INVENTION

1. Field of the Invention

This invention generally relates to document verification and authentication systems and, more particularly, to the authentication equipment for optically scanning documents.

2. Description of the Prior Art

In the past most document authentication procedures have relied upon visual and tactile examination of documents by highly trained personnel. The examiner subjectively evaluates all of the aspects of each document including the texture of the paper, the clarity of the printing, and the fine details of the engraving. Although these procedures are quite reliable, they are slow, costly, and inefficient.

Recently, mechanical and optical systems have been introduced in this field in order to speed up the processing of documents and to reduce the man power heretofore required. These systems employ optical techniques to scan documents for ultra violet flourescence and/or to measure the spatial position of selected printed portions of the documents that are hard to reproduce. In addition, some documents are not printed with magnetic ink to permit electronic verification. Although these newer systems are substantially faster than manual observation, these systems still are not completely reliable, are too expensive for ordinary use, and are slow compared with the document handling machines that are used in conjunction with these systems.

SUMMARY OF THE INVENTION

The present invention is directed to a method and apparatus for authenticating documents by optically scanning the document paper to verify the presence of colored fibers or other colored materials in the paper and for indicating the authenticity of the document if a predetermined number of such fibers or materials is present. The document authenticating apparatus includes an optical assembly for focusing white light onto a continuously moving document. The light is reflected from the document and passed through two optical filters that separate the white light into two predetermined spectral components. For verifying the presence of red and blue fibers in the document paper, the two optical filters separate the white light into components of red and blue light. Each component of light is incident on a separate photomultiplier tube that produces output pulses that have relative amplitudes depending on the intensity of the colored light reflected from the paper and pulse widths corresponding to the thickness of the fiber. Each photomultiplier is connected to one channel of a signal processing circuit. The pulses in each channel of the signal processing circuit are subtracted from each other and the resulting signals are counted. The apparatus authenticates the document if a predetermined, minimum number of fibers of each color are sensed. The signal processing circuit also includes both a fiber width discriminator to eliminate any pulses coming from objects on the paper that are not fibers and an illumination level compensator for compensating the circuit for documents having differing reflectivity.

In operation, any blue colored fiber generates a pulse from the photomultiplier in the channel receiving the component of red light and any red fiber generates a pulse in the channel receiving blue light. The red fibers produce no pulses in the channel receiving red light, and the blue fibers produce no pulses in the channel receiving blue light. The black and green lines and fibers on the document produce two equal pulses simultaneously in the channels, and the pulse subtraction between the channels cancels out the two pulses so that these colors are not counted.

It is an object of the present invention to provide a novel method and apparatus that overcomes the limitations and disadvantages of the prior art.

A further object of the present invention is to authenticate large quantities of documents at high speed. The present invention contemplates a quick, simple test that is completed in one motion across the document.

An additional object of the present invention is to eliminate the need for manual inspection of documents. The Document Authentication System is intended to be part of an automatic, independently operating, document processing system.

A further object of the present invention is to provide an apparatus for authenticating documents that does not require modification of the documents already in use. The present invention authenticates the paper on which the documents are printed. Thus, the printing on the documents need not be modified and the documents need not be coded.

Additional objects and features of the invention will appear from the following description in which the preferred embodiment has been set forth in detail in conjunction with the accompanying drawings.

DESCRIPTION OF THE PREFERRED EMBODIMENT

Figure 2:
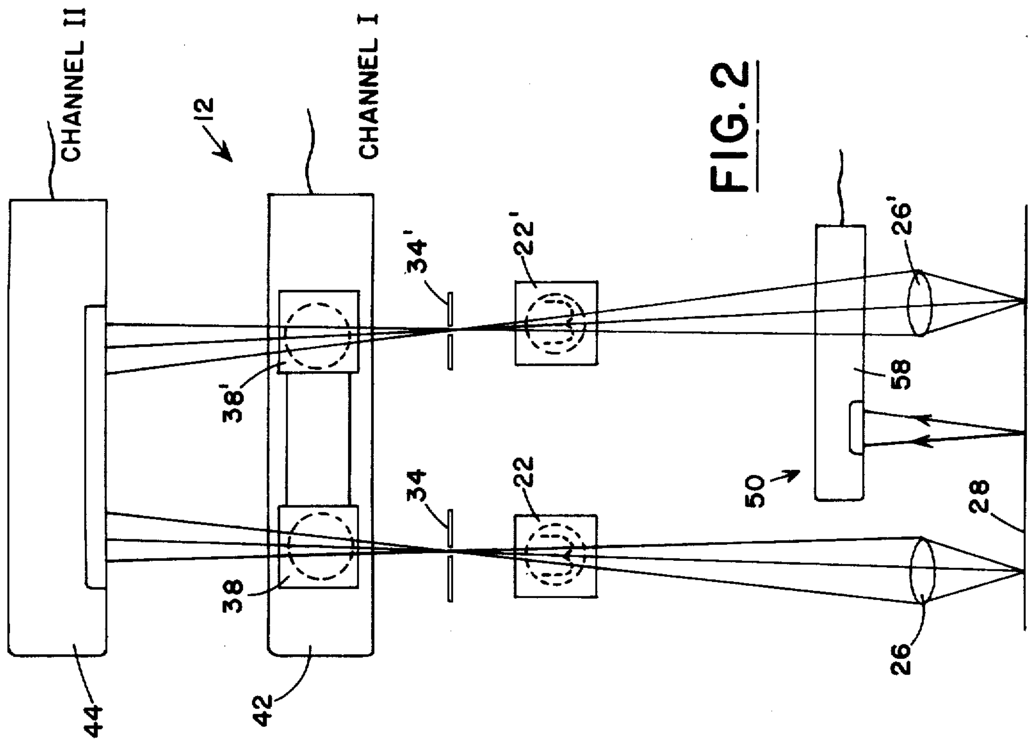
FIG. 2 is a diagrammatic, front elevational view of the document authentication apparatus illustrated in FIG. 1.
Figure 1:
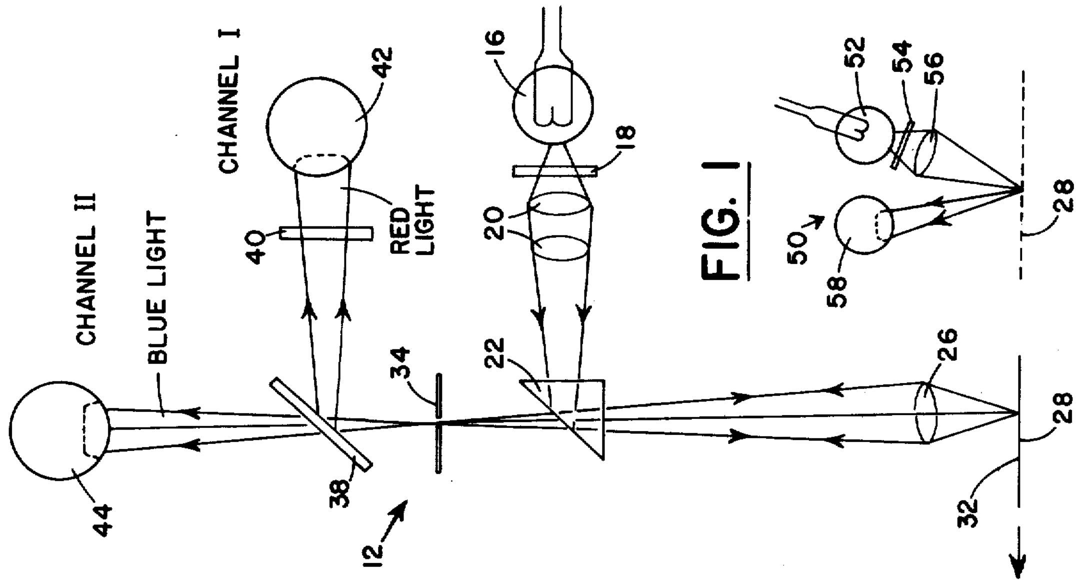
FIG. 1 is a diagrammatic, side elevational view of a document authentication apparatus according to the present invention.

Referring to FIGS. 1 and 2, reference numeral 12 generally indicates an optical scanning apparatus for authenticating documents by verifying the presence of a predetermined number of colored fibers incorporated into the paper. In the present embodiment documents are scanned for the presence of red and blue fibers in the paper.

For the purposes of definition the term "documents" includes but is not limited to currency, paper money, stock certificates, bonds, and negotiable instruments.

The optical scanning apparatus 12 includes two parallel, illumination paths that are constructed and operate in the same manner. For brevity only one path will be described and corresponding parts will be identified by primed numbers. The illumination path begins with a horizontally directed lamp 16. The lamp is a conventional tungsten filament light powered from a DC power source (not shown) in order to eliminate 120 Hertz ripple. The light from the lamp 16 is directed through a heat absorbing filter 18 that reduces the thermal load on the optical scanning apparatus 12. After passing through the heat absorbing filter 18, the light is directed through a plurality of condensing lenses 20 that focus the illumination onto a beam splitter 22. The beam splitter is a conventional optical prism. In one embodiment of the present invention that was constructed a standard microscope illuminator was used to provide the lamp 16, the heat absorbing filter 18, and the condensing lens 20.

The beam splitter 22 reflects the horizontally directed light from the lamp 16 downward into a conventional objective lens 26. The objective lens focuses the illumination at a focal plane 28 and also magnifies the size of the image reflected from the focal plane. In one embodiment of the present invention the objective lens had a magnification factor of 5. During scanning the document 32 is moved horizontally along the focal plane 28 at a constant rate of speed. The document is moved by a means not shown. In FIG. 1 the document is moved from right to left so that the bill edge detector 50, hereinafter described, is encountered first.

The light that is incident on the moving document is reflected back into the objective lens 26 and is thereafter directed vertically upward through the beam splitter 22. The beam splitter functions both to connect the horizontally directed illumination from the lamp 16 into the vertically directed optical path and also to pass the reflected light upward from the document 32.

From the beam splitter 22 the light is directed into a slit aperture 34. The size of the slit aperture is optimized for the signal processing system hereinafter described. In one embodiment that was constructed to scan fibers having a diameter of 1 mil. or 1/1000th of an inch, an objective lens 26 having a magnification factor of 5 and a slit aperture having a width of 5 mils. were used. The slit aperture trims the image reflected from the documents and eliminates any peripheral fringing of the image.

The light passing through the slit aperture 34 is thereafter directed into a dichroic beam splitter 38. The dichroic beam splitter also functions as a filter for the light because the beam splitter passes blue light without defection and reflects red light. The dichroic beam splitter incorporates a thin film, multilayer filter that is positioned at 45° with respect to the vertically directed incident light. In one embodiment that was constructed the dichroic beam splitter passed only those wave lengths longer than 0.64 microns and reflected all other wavelengths.

The dichroic beam splitter 38 reflects one portion of the light horizontally into a red filter 40. The filter is a passband optical illumination passing illuminatin having a wavelength of between 0.40 and 0.48 microns. The illumination passing through the red filter is thereafter incident on a photomultiplier tube 42. The photomultiplier tube is a conventional, side-looking, photomultiplier tube that is electrically connected to Channel I of the signal processing circuit hereinafter described.

The dichroic beam splitter 38 passes the other portion of the light upward into a second photomultiplier tube 44. The photomultiplier tube 44 is also a conventional, side-looking, photomultiplier tube and is connected to Channel II of the signal processing circuit hereinafter described.

Referring to FIG. 2, the optical scanning apparatus 12 includes two parallel illumination paths. The light in each path is separated by a sufficient distance so that the same fiber is not sensed simultaneously in both paths. It should also be noted that components of red light in both paths are incident on the photomultiplier tube 42 and the components of blue light in both paths are incident on the photomultiplier tube 44.

The optical scanning apparatus 12 futher includes a bill edge sensor 50 for providing a signal to the electronic signal processing circuit, hereinafter described, indicating that a document is ready to be authenticated. The bill edge sensor includes a conventional lamp 52 for providing white light for the sensor. The light from the lamp 52 passes through both a heat absorbing filter 54 and a condensor lens 56 and is focused onto the focal plane 28. The light is thereafter reflected into a conventioal photomultiplier tube 58. The lamp 52, the heat absorbing filter 54, the condenser lens 56, and the photomultiplier tube 58 are similar in construction and operation to the like named components hereinbefore described. When the leading edge of a document intercepts the light in the bill edge sensor, the output of the photomultiplier tube 58 increases and this provides a pulse to the signal processing circuit hereinafter described.

Figure 3:
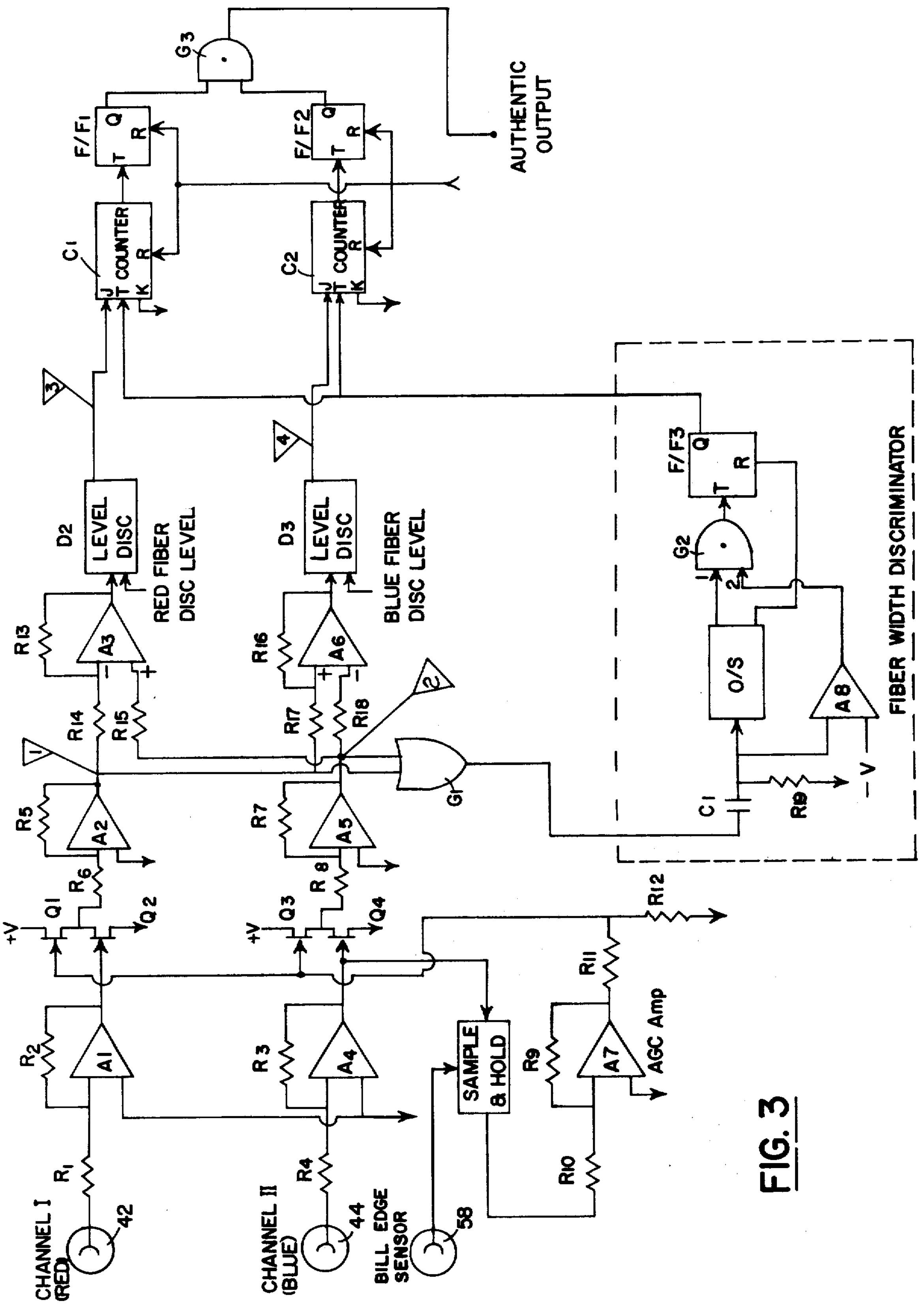
FIG. 3 is a schematic diagram of a two channel, signal processing circuit for the document authentication apparatus of FIG. 1 according to the present invention.

The signal processing circuit is illustrated in FIG. 3. The circuit includes two parallel amplifying Channels, I and II, each connected to the photomultipliers 42, 44 respectively. As the fibers pass through the focus points of the optical scanning apparatus 12, the two photomultipliers produce pulses having an electrical polarity corresponding to a reduction in the incident light thereon. Depending on the color of the fiber the pulses have different relative amplitudes. In addition, since each document is transported through the apparatus at a constant speed, the pulse width of the pulses is directly proportional to the thickness of the fibers. It should also be noted that since the fibers are widely separated in the paper, the channels do not sense different fibers simultaneously.

The photomultiplier 42 that receives red light is connected to an amplifier A1 and a resistor R1. Amplifier A1 is a conventional preamplifier for amplifying the low level signals coming from the photomultiplier 42. Resistor R1 sets the gain of the amplifier A1. The photmultiplier 44 that receives blue light is connected to a resistor R4 and an amplifier A4. The construction and operation of amplifier A4 is similar to amplifier A1.

The outputs of the amplifiers A1, A4 are connected to two networks of field effect transistors Q1, Q2, Q3, and Q4. These transistor networks normalize the relative red and blue outputs from the amplifiers A1, A4 in order to compensate for variations in reflectivity or whiteness of the documents. In particular, the output of amplifier A1 is supplied to the gate of Q2 and likewise the output of amplifier A4 to the gate of Q4. In addition, a bias voltage from an automatic gain control amplifier A7, hereinafter described, is applied to the gates of Q1 and Q3. This bias voltage controls the drain to source resistance of transistors Q2 and Q4. Thus, the transistors Q1 and Q2 act like a variable voltage divider and adjust the gain of amplifier A1. The transistors Q3 and Q4 operate similarly with amplifier A4.

Connected to the outputs of the two transistor networks hereinbefore described are amplifiers A2, A5. These two amplifiers further increase the signals from their respective photomultipliers 42, 44. The output of amplifier A2 at the point indicated by reference numeral 1 is proportional to the intensity of red filtered light incident on the photomultiplier 42, of Channel I less a background level supplied from an automatic gain control circuit hereinafter described. The output of amplifier A5 at the point indicated by reference numeral 2 is proportional to the intensity of blue filtered light incident on the photmultiplier 44 of Channel II less a similar background level supplied from the automatic gain control circuit.

The photomultiplier 58 in the bill edge sensor 50 (FIG. 1) is connected to a conventional sample and hold circuit. The sample and hole circuit in combination with an automatic gain control amplifier A7 during the entire period that the document is being scanned. The output of the automatic gain control amplifier A7 is connected to the gates of transistors Q1, Q3 hereinbefore described. Referring to Channel I, reference numeral A3 indicates a mixing amplifier. The pulses from amplifier A2 are connected to an inverted or negative input to amplifier A3 and the pulses from amplifier A5 are connected to a noninverted or plus input to amplifier A3. Thus, the output of amplifier A3 is proportioned to the output of amplifier A5 minus the output of amplifier A2. Referring to Channel II, amplifier A6 is a mixing amplifier connected in a similar manner as amplifier A3. The output of amplifier A2 is connected to a noninverting or plus input to amplifier A6 and the output of amplifier A5 is connected to an inverting or negative input to amplifier A6. Thus, the output of amplifier A6 is proportional to the output of amplifier A2 minus the output of amplifier A5.

The outputs of the mixer amplifiers A3, A6 are connected to the level discriminators D2, D3 respectively, A reference input or bias identified as the red or blue fiber discriminator level in FIG. 3 is also applied to the discriminators in order to set the minimum threshold signal level. An output at point 3 from the discriminator D2 indicates that a red object is passing beneath the photomultipliers 42, 44. An output at point 4 from the discriminator D3 indicates that a blue object is passing underneath the photomultipliers 42, 44. Any green or black objects recorded by the photomultipliers 42, 44 are cancelled out by the mixer amplifiers A3, A6. Specifically, any black line on the document produces two corresponding, equal outputs from the amplifiers A2, A5. These two equal outputs cancel each other out at the inverting and noninverting inputs to the amplifiers A3, A6.

Referring to the fiber width discriminator subcircuit, the outputs from amplifiers A2, A5 are connected to an analog OR gate G1. The OR gate G1 passes any single pulse coming from the outputs of amplifiers A2 or A5 and blocks any simultaneous pulses. The pulse from gate G1 is formed to a sharp, rising edge by the differentiating circuit C1, R19. The pulse from gate G1 triggers a one-shot element O/S that puts a high signal at the input terminal 1 to an AND gate G2. Concurrently the pulse from gate G1 is sent to amplifier A8 that also puts a high signal at the input terminal 2 to the AND gate G2. Since the two signals at terminals 1 and 2 of the AND gate G2 occur nearly simultaneously, the output of AND gate G2 does not change.

At some later point in time the output from either amplifier A2 or A5 drops off, and the output from the OR gate G1 goes low. In response the differentiating circuit C1, R19 produces a negative going pulse. Although the negative going pulse does not effect the one shot element O/S, the negative going pulse passes through the amplifier A8 to the AND gate G2. Any negative transition from the differentiating circuit that occurs during the time of a high signal from the one-shot will trigger the flip-flop F/F3 through the AND gate G2.

In effect, the timing interval of the fiber width discriminator is provided by the transition of the one shot element O/S. If an actual fiber is sensed on the document, the pulse through the OR gate G1 begins and ends during the transition of the one shot element O/S and the flip-flop F/F3 is triggered. In contrast, any artifact or non-line on the bill produces a pulse through the OR gate G1 that is longer in duration than the transition of the one shot element O/S. When the output from the OR gate G1 goes low, the amplifier A6 is prevented from triggering the flip-flop F/F3 because the AND gate G2 no longer has an input signal at terminal 1 from the one-shot present. In one embodiment that was constructed the fiber width subcircuit discriminated fibers having a diameter of approximately 1/1000th of an inch.

The output of flip-flop F/F3 is connected to the T inputs of two counters C1, C3. The counters are connected such that each will record a positive transition from the flip-flop F/F3 when there is a high level at the J input from the level discriminators D2, D3. The J inputs to the counters C1, C3 are held high only if either a red fiber or a blue fiber has been detected by the optical scanning apparatus 12 (FIG. 1). The counters C1, C2 thus count the number of times either a red or blue color having a minimum thickness is sensed by the apparatus. In addition, the counters are connected so that when a minimum number of fibers of each color has been detected on one document the counters C1, C2 trigger two flip-flops F/F1, F/F2. The two flip-flops F/F1, F/F2 are connected to a second AND gate G3 so that when the minimum number of fibers of both colors has been detected the AND gate G3 is enabled to provide an output indicating the authenticity of the document.

In operation, the leading edge of the document 32 first passes through the bill edge sensor 50. The change in output from the bill edge photomultiplier 58 triggers the sample and hold circuit to maintain the reflectivity or whiteness output level of amplifier A4. The output of the sample and hold circuit biases the two networks of field effect transistors Q1, Q2, Q3, Q4 and normalizes the circuit for documents having varying amounts of reflectivity.

A red fiber on the document is sensed as a black line or a drop in output from the photomultiplier 44 in Channel II. A red fiber is not sensed in Channel I by the photomultiplier 42 because a red fiber is not seen in red light. The red fiber thereby produces no output from amplifier A2 at point 1 and a positive output from amplifier A5 at point 2. These two outputs are subtracted by amplifiers A3, A6 so that a signal level indicating a red fiber is at point 3 and no signal level is at point 4. The positive output from the amplifier A5 at point 2 triggers the one shot element O/S. If the red fiber is sufficiently narrow as to pass through the light beam during the transition of the one-shot O/S, the fiber width discriminator provides an output to the counters C1, C2. The simultaneous occurrence of a high level signal from the discriminator D2 and an output from the flip-flop F/F3 of the fiber width discriminator causes the counter C1 to record the pulse. When the minimum number of red fibers has been counted, flip-flop F/F1 is enabled.

A blue colored fiber is processed by the circuit in an exactly analogous manner. A blue fiber produces a decreased output level from the photomultiplier 42 in Channel I and no change in the photomultiplier 44 in Channel II because a blue fiber is not seen in blue light. The blue fiber thereby produces no output from amplifier A5 at point 2 and a positive output from amplifiers A3, A6 so that a signal level indicating a blue fiber is at point 4 and no signal level is at point 3. The positive output from the amplifier A2 at point 1 triggers the one shot element O/S. The operation of the fiber width discriminator is the same for blue fibers as for red fibers described hereinbefore. When the minimum number of blue fibers has been counted by the counter C2, the flip-flop F/F2 is enabled. When both flip-flops F/F1 and F/F2 are enabled, the AND gate G3 provides an output indicating the authenticity of the document.

Although the foregoing description of the preferred embodiment describes detecting just red and blue fibers, it is contemplated that the present invention includes optically scanning documents for the presence of lines or fibers having any predetermined color and having any predetermined width. The apparatus can sense any one, predetermined color if the optical filters 38, 40 in fornt of the photomultipliers 42, 44 are selected so that photomultipliers have equal outputs for all colors that are not the predetermined color and unequal outputs for the predetermined color. In addition, the apparatus can scan for lines or fibers having any predetermined width by merely adjusting the period of transition of the one-shot element O/S.

It should be appreciated that the apparatus can also operate by removing the automatic gain control and forming a ratio of the pulses in each channel. In the preferred embodiment described hereinbefore, the pulses from the photomultipliers 42, 44 are normalized by the automatic gain control amplifier A7 and the voltage dividing network of transistors Q1, Q2, Q3, and Q4. The normalized pulses are thereafter subtracted from each other by the mixing amplifiers A3, A6. On the other hand, in forming a ratio, the circuit can compute a ratio of pulse heights and the logic elements in the circuit can determine if the ratio is within a predetermined band of values. If so, the line or fiber is present on the document. The computation of a pulse height ratio permits the apparatus to scan documents having wide variations in reflectivity and to scan for a wider band of color.

Although the best mode contemplated for carrying out the present invention has been herein shown and described, it will be apparent the modification and variation may be made without departing from what is regarded to be the subject matter of the invention.

I claim:

1. Apparatus for authenticating documents by counting the number of fibers or lines or predetermined color and predetermined physical dimension on the document, comprising: a light source producing illumination focusable on a document and reflectable thereoff; means for moving the document with respect to the illumination focused thereon by the light source; means for spectrally discriminating the illumination reflected from the document into signals representing the predetermined color; means for measuring a physical dimension of the fibers or lines on the document from the signals representing the predetermined color; and means responsive to the discriminating means and the measuring means for counting the number of fibers or lines having the predetermined color and predetermined physical dimension on the document.

2. Apparatus of claim 1 wherein the spectral discriminating means includes: two optical filters each positioned to intersect the illumination reflected from the document; two light sensitive detectors each responsive to the filtered illumination from one of the optical filters and each providing an output signal proportional to the intensity of the filtered illumination thereon; automatic gain control means for normalizing the output signals from the two detectors for variations in reflectivity of the documents, said gain control means being responsive to the output signal from a detector; means for generating a signal proportional to the difference between the two output signals from the light sensitive detectors, said optical filters being selected such that the two output signals from the detectors are substantially equal for all colors other than the predetermined color and substantially unequal for the predetermined color; and logic means for determining whether said difference signal is within a predetermined tolerance and for providing a signal to the counting means indicating that the predetermined color is on the document when said tolerance is exceeded.

3. Apparatus of claim 1 wherein the spectral discriminating means includes: two optical filters each positioned to intersect the illumination reflected from the document; two light sensitive detectors each responsive to the filtered illumination from one of the optical filters and each providing an output signal proportional to the intensity of the filtered illumination thereon; means for generating a signal proportional to the ratio of the two output signals from the light sensitive detectors, said optical filters being selected such that the two output signals from the detectors are substantially equal for all colors other than the predetermined color and substantially unequal for the predetermined color; and logic means for determining whether said ratio signal from the signal generating means is within a predetermined tolerance and for providing a signal to the counting means indicating that the predetermined color is on the document when said tolerance is exceeded.

4. Apparatus for authenticating documents by counting the number of fibers or lines of predetermined color on the document, comprising: a light source producing illumination focusable on the document and reflectable thereoff; means for moving the document with respect to the illumination focused thereon by the light source; a first light sensitive detector responsive to the reflected illumination from the document and indicating variations in the intensity of said illumination; an optical filter positioned to intersect the reflected illumination from the document and to selectively pass only illumination having a predetermined wavelength; a second light sensitive detector responsive to the illumination having the predetermined wavelength from the optical filter and indicating variations in the intensity of said illumination; means responsive to the variations from the light sensitive detectors for counting the number of fibers having the predetermined color; means for measuring a physical dimension of the fibers or lines on the document passing through the illumination and for preventing the counting means from counting fibers or lines having physical dimensions other than a predetermined value; and logic means for authenticating those documents having a predetermined number of colored fibers or lines thereon.

5. Apparatus of claim 4 further including means connected to the light sensitive detectors for compensating the counting means for variations in reflectance of the documents.

6. Apparatus of claim 4 wherein the measuring means is responsive to the variations from the light sensitive detectors.

7. Apparatus for authenticating documents by counting the number of fibers or lines of two predetermined colors on the document, comprising: a light source producing illumination focusable on the document and reflectable thereoff; means for moving the document with respect to the illumination focused thereon by the light source; a first optical filter positioned to intersect the reflected illumination from the document and to pass only illumination having substantially a first predetermined color; a second optical filter positioned to intersect the reflected illumination from the document and to pass only illumination having a substantially second predetermined color; a first light sensitive detector responsive to the illumination having the first predetermined color from the first optical filter and providing a first output signal proportional to the intensity of said illumination; a second light sensitive detector responsive to the illumination having the second predetermined color from the second optical filter and providing a second output signal proportional to the intensity of said illumination; automatic gain control means for normalizing the output signals from the first and second detectors for variations in reflectivity of the documents, said gain control means being responsive to the output signal from the second detector; means for subtracting the second output signal from the first output signal and for generating a third output signal proportional to the difference therebetween; means for subtracting the first output signal from the second output signal and for generating a fourth output signal proportional to the difference therebetween; first logic means for determining whether said third output signal exceeds a predetermined value and for providing a fifth signal when said tolerance is exceeded; second logic means for determining whether said fourth output signal exceeds a predetermined value and for providing a sixth signal when said tolerance is exceeded; means for counting the occurrences of the fifth and sixth signals respectively and for providing an authenticating signal when the numbers of the two occurrences exceed two predetermined minimum numbers.

8. Apparatus of claim 7 further including fiber width discriminator means responsive to said first and second output signals for measuring a physical dimension of the fibers or lines of said predetermined colors and for preventing said counting means from counting the fifth and sixth signals from those lines or fibers having dimensions exceeding a predetermined dimension.

9. Method for authenticating documents by computing the number of selected fibers or lines on each document, comprising the steps of: reflecting illumination off of the document; moving the document at a constant speed with respect to the illumination; filtering the illumination into components, each having a predetermined wavelength, measuring the intensity of said components of predetermined wavelength; and determining the number of fibers or lines of each wavelength on the document from the intensity measurements.

10. Method of claim 9 further including the steps of: measuring a physical dimension of each fiber or line from the intensity measurements; and preventing the fibers or lines not having a predetermined dimension from being computed.

11. Method for authenticating documents by computing the number of selected fibers or lines on each document, comprising the steps of: reflecting illumination off of the document; moving the document at a constant speed with respect to the illumination; filtering the illumination into components, each having a predetermined wavelength; measuring the intensity of each component of predetermined wavelength; compensating the intensity measurements for variations in reflectivity of the documents; subtracting the intensity measurements to obtain the differences therebetween; determining the number of fibers or lines of each wavelength on the document from the differences; and authenticating the document when the number of fibers and lines exceeds a predetermined number.

* * * * *